United States Patent [19]
Erbs

[11] Patent Number: 5,230,222
[45] Date of Patent: Jul. 27, 1993

[54] COMPRESSOR CRANKCASE HEATER CONTROL
[75] Inventor: Daryl G. Erbs, Palermo, N.Y.
[73] Assignee: Carrier Corporation, Syracuse, N.Y.
[21] Appl. No.: 805,775
[22] Filed: Dec. 12, 1991
[51] Int. Cl.⁵ ............................................. F25B 43/02
[52] U.S. Cl. ................................... 62/192; 62/472
[58] Field of Search ................................. 62/192, 472
[56] References Cited
U.S. PATENT DOCUMENTS
5,012,652  5/1991  Dudley ................................. 62/472
FOREIGN PATENT DOCUMENTS
0022947  1/1987  Japan ................................... 62/472

Primary Examiner—William E. Wayner

[57] ABSTRACT

A crankcase heater control system for a refrigeration system includes a first temperature sensor for sensing the outdoor temperature, and, a second temperature sensor for sensing compressor discharge temperature. A controller is operatively connected to temperature sensors and the crankcase heater. When the ambient temperature falls below a first pre-determined temperature the controller compares the compressor discharge temperature to a second pre-determined temperature which is greater than the first pre-determined temperature and energizes the crankcase heater when the compressor discharge temperature falls below the second pre-determined temperature.

5 Claims, 3 Drawing Sheets

COMPRESSOR CRANKCASE HEATER CONTROL

BACKGROUND OF THE INVENTION

1. Field of the Invention

This invention relates to a control for energizing a heater provided to raise the temperature of the lubricating oil in a compressor, and, in particular to a system wherein the heater comprises the coils of an electric motor and the coils are selectively energized to a non-rotating condition in response to sensed temperatures.

2. Description of the Prior Art

It is well known that under certain conditions, some refrigerants and the oil used as a lubricant for the compressor of a refrigeration unit are freely miscible. During normal operation of the refrigeration circuit, because of operating pressures and temperatures, the oil in the sump of the compressor, will be substantially free of refrigerant. However, when the compressor is shut off, refrigerant in the system tends to migrate and condense in the coldest parts of the system. As an example, when a system is shut down on a cool night, the temperature will be warmer inside and the refrigerant in the system will tend to migrate to the cool outdoor coil and the compressor. In the morning as the outdoor temperature goes up, the outdoor coil will warm up far quicker than the compressor because of the compressors large thermal mass. As a result refrigerant which had condensed in the outdoor coil will migrate to the compressor. Under such conditions there is a danger that the oil in the sump will be diluted and the risk is high for a flooded compressor start due to the presence of liquid refrigerant in the compressor sump. Crankcase heaters have been designed to keep refrigerant from migrating into the crankcase or sump of a hermetic compressor during an off cycle. Some crankcase heaters are normally energized continuously even though they are only effective part of the time. Such heaters may be electrical resistance elements which are installed directly in the sump of the compressor, or may be wrapped around the outer surface of the compressor casing in heat transfer relation with the oil stored in the sump.

It has been found that heating elements for this type of crankcase heater are expensive. Since hermetic compressors are standard equipment in many refrigeration systems today, and since the motor and crankcase are in a common space in these compressors, use of the motor windings has been suggested for use as a heating element to heat the oil within the compressor. U.S. Pat. No. 3,133,429 "Compressor Crank Case Heating Device" discloses such a crankcase heating system.

U.S. Pat. No. 4,066,869 "Compressor Lubricating Oil Heater Control" discloses a thermostatically operated switch associated with a crankcase heater for selectively connecting the heater to a source of electrical energy. The switch is responsive to a temperature indicative of lubricating oil temperature and to operation of the compressor. The switch energizes the heater when the sensed temperature falls below a predetermined level and the compressor is not in operation. The switch de-energizes the heater when the compressor is operable regardless of the temperature of the ambient. U.S. Pat. No. 5,012,652 "Crank Case Heater Control for Hermetic Refrigerant Compressors" discloses another crankcase heater control to selectively energize the crankcase heater when needed to therefore reduce the energy consumed by the heater. The '652 patent senses temperature at the compressor, the indoor coil, and ambient temperature. The sensed temperatures are compared and if the compressor temperature is not a specified amount higher than the lower of the other two sensed temperatures, the crankcase heater is energized. When the compressor temperature rises to or is a specified amount above the lower of the other two temperatures the crankcase heater is de-energized.

U.S. Pat. No. 4,638,643 "Control System for Compressor Motor Used With Air Conditioning Unit" discloses a control system that uses compressor motor windings to preheat a compressor on actuation of a operation switch.

SUMMARY OF THE INVENTION

It is an object of this invention to prevent refrigerant migration to the sump of a hermetic compressor.

It is another object of this invention to control crankcase heat in a hermetic compressor.

It is a further object of this invention to reduce the amount of energy required by a crankcase heater.

These and other objects of the present invention are achieved by sensing outdoor temperature and compressor discharge gas temperature. The crankcase heater is energized when a controller determines that outdoor air temperature is less than or equal to a first predetermined value and that the compressor discharge gas temperature is less than a second predetermined value which is higher than the first predetermined value. In the preferred embodiment the crankcase heater is the compressor motor winding which is driven through an inverter drive.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts, and wherein;

DETAILED DESCRIPTION OF THE PREFERRED EMBODIMENT

Figure 1:
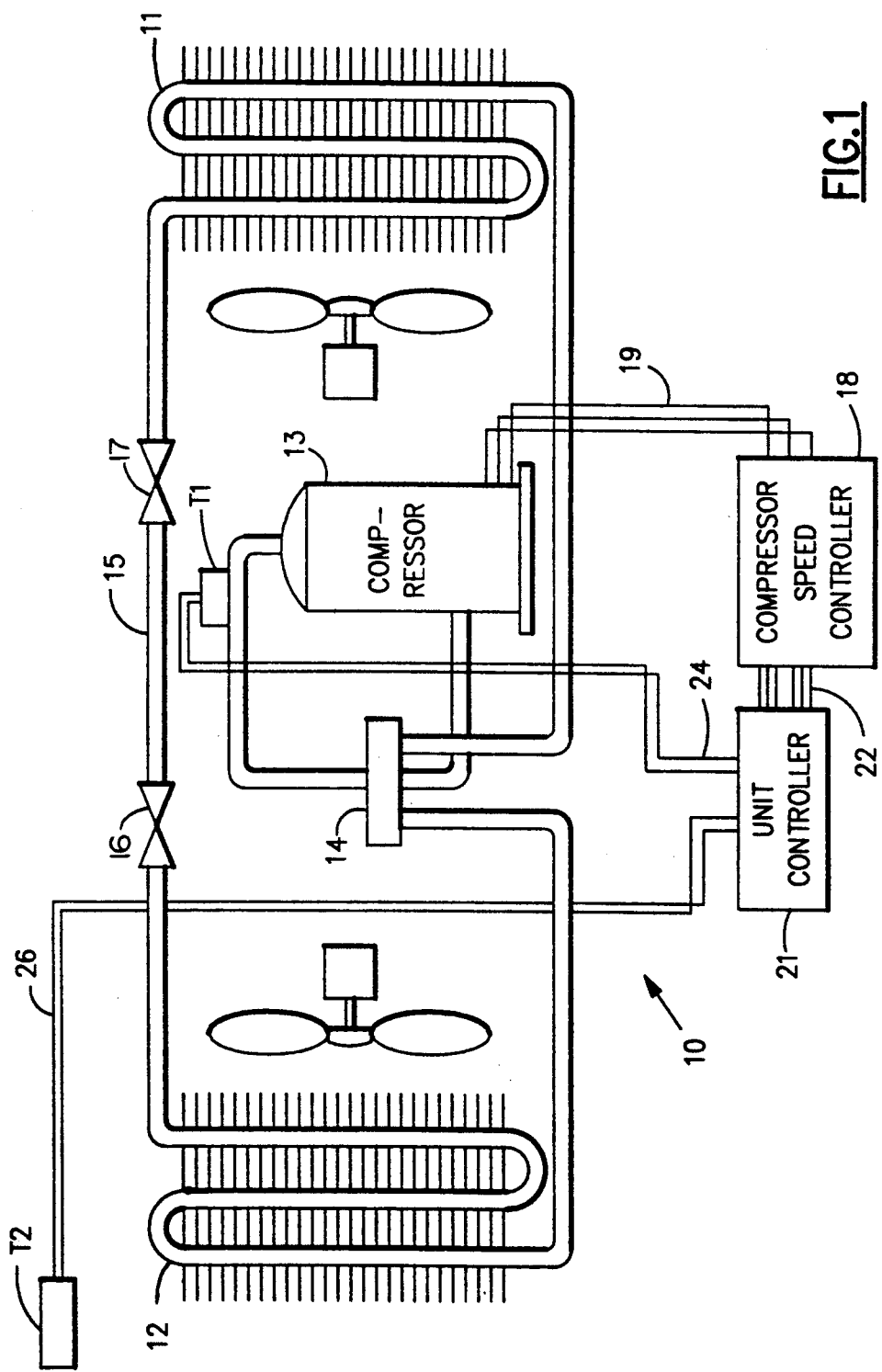
FIG. 1 is a schematic illustration of a heat pump system having the present invention incorporated therein.

Referring now to the FIG. 1, there is shown a heat pump system 10 which includes an indoor coil 11, an outdoor coil 12, a compressor 13 and a reversing valve 14. Installed in the line 15 between the indoor and outdoor coils 11 and 12 are expansion valves 16 and 17 each of which has a provision for bypassing refrigerant when it is not acting as an expansion device. All of these components operate in a conventional manner to provide a cooling function while operating in the air conditioning mode and a heating function while operating in a heat pump mode.

Although the present invention is equally applicable to either constant speed or variable speed systems, it will be described with reference to a variable speed system. Such a system contemplates the use of variable speed motors such as, for example, electronically commutated motors (ECMs) or inverter driven AC induction motors to drive the compressor 13 which is normally located outdoors in an enclosure with the outdoor coil 12. A compressor speed controller 18 is therefore provided to communicate with and to coordinate the operation of the compressor and its associated equipment.

The controller 18 is electrically connected to the compressor 13 by electrical leads 19, and, to a unit controller 21 by leads 22. The unit controller 21 is connected to a compressor discharge line temperature thermistor T1 by way of leads 24, and to an ambient temperature thermistor T2 by way of leads 26. The unit controller 21 is also usually adapted to control other system components, however for purposes of this illustration and description of the present invention such interconnections are not shown in the drawing in order to simplify description of the invention.

Figure 2:
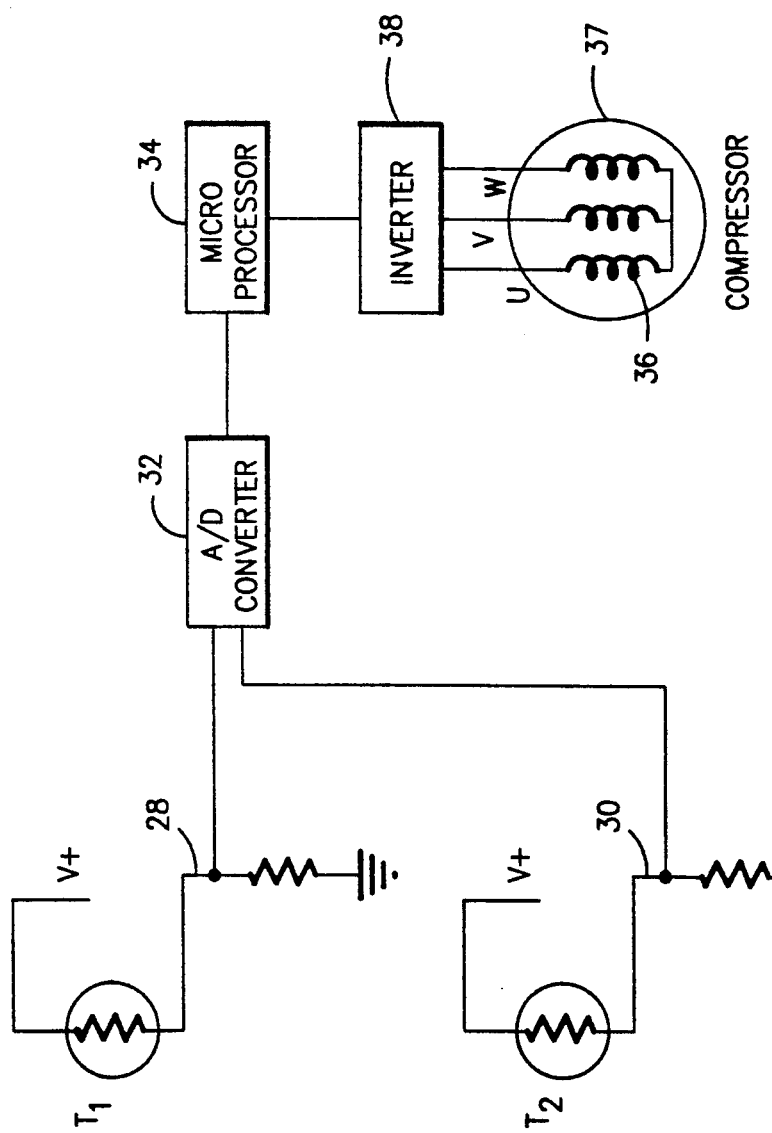
FIG. 2 is a schematic illustration of the controller portion of the invention.
Figure 3:
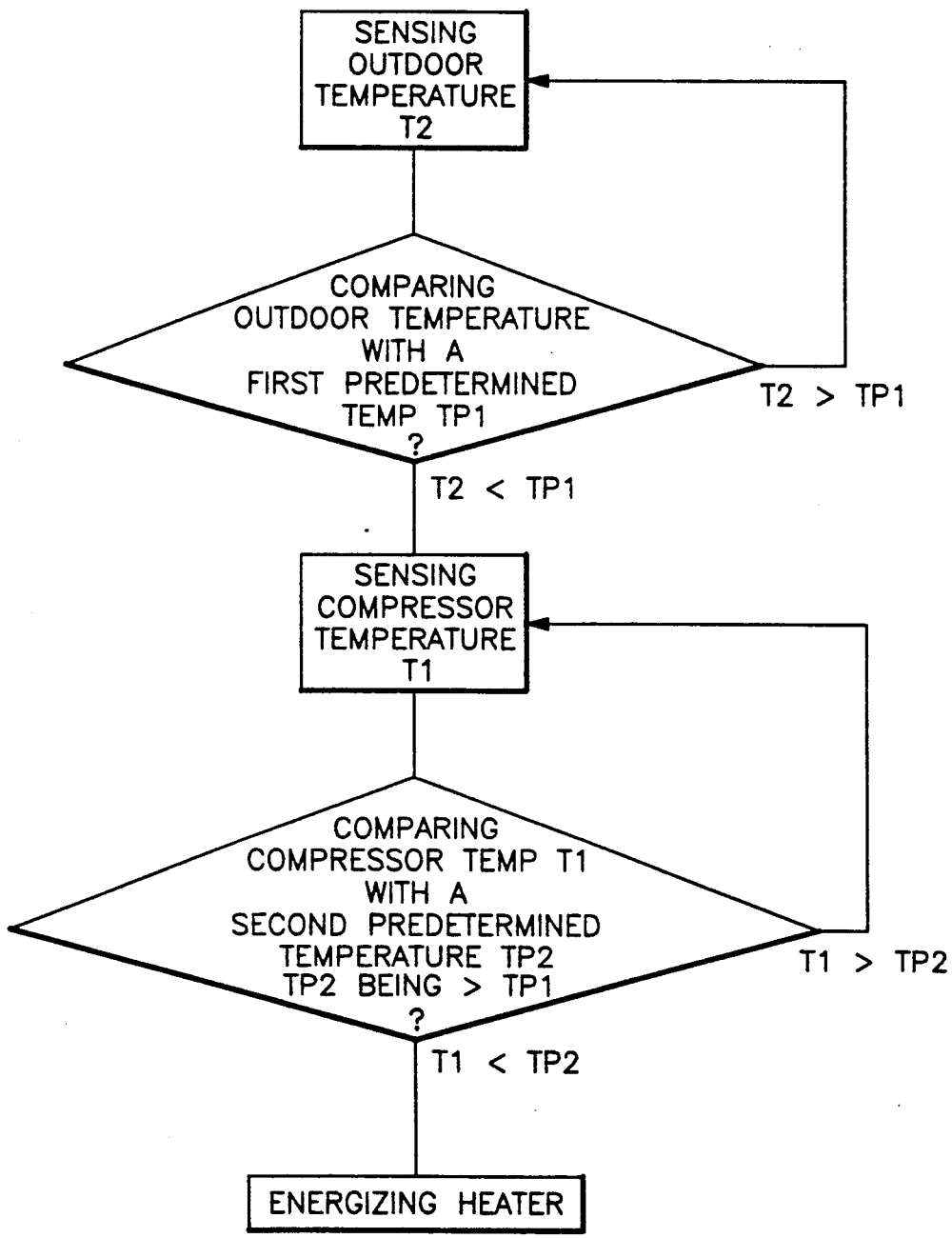
FIG. 3 is a flow chart showing the logic of a typical control program in the microprocessor of FIG. 2 to carry out the heater control of the present invention.

FIG. 2 shows the unit controller components that are applicable to the crankcase heater control function. The temperature at each of the thermistors T1 and T2 are typically interpreted through voltage divider networks 28 and 30 respectively and an analogue to digital converter 32 which is connected in turn to a microprocessor 34. The microprocessor 34 is in turn connected to the compressor speed controllers 38 which in the illustrated embodiment comprises an inverter. The output of the inverter is a three phase frequency and voltage controlled AC power which is connected to the compressor motor windings 36. An inverter typical of the type used herein is illustrated and described in U.S. Pat. No. 4,806,839 Device for Energizing a Hermetic Motor Using Inverter.

The inverter drive 38 is adapted to control the speed of a three-phase induction motor 37 in a hermetic rotary compressor. The inverter drive is capable of producing a low voltage wave out putto energize the compressor windings 36 without causing any rotation of the motor. It is been found that a low voltage, high frequency output on the order of 80 watts ±50 watts at a frequency of 120 hertz is capable of providing the crankcase heat function without causing motor rotation.

In operation the unit controller 21 monitors both the ambient temperature sensor T2 and compressor discharge line temperature sensor T1. The controller is programmed to indicate the potential need for crankcase heat when the ambient temperature is determined to be less than 15° centigrade. At this time the unit controller 21 will monitor the discharge line temperatures sensor T1, and, when this temperature falls below 26° centigrade the inverter 38 is put into the crankcase heat mode, supplying an input of 120 hertz, 50 watts to the compressor motor windings 36.

Because the compressor discharge line sensor T1 is located on a good conductive path to the compressor 13, this arrangement results in a fairly constant control of the compressor base temperature to 26° C.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. In a refrigeration system serially including a hermetic compressor having a crankcase heater, an outdoor coil, an expansion device, and an indoor coil, crankcase heater control means comprising:

first temperature sensing means for sensing a temperature indicative of outdoor temperature;

second temperature sensing means for sensing a temperature indicative of compressor temperature;

controller means operatively connected to said first and second temperature sensing means, and, said crankcase heater, for comparing said temperature sensed by said first sensing means to a first predetermined temperature; and, when said temperature sensed by said first temperature sensing means falls below said first predetermined temperature, comparing said temperature sensed by said second temperature sensing means to a second predetermined temperature, which is greater than said first predetermined temperature, and, for energizing crankcase heater when said temperature sensed by said temperature sensing means falls below said second predetermined temperature.

2. The apparatus of claim 1 wherein said first predetermined temperature is between about 10° to 20° C.

3. The apparatus of claim 2 wherein said second predetermined temperature is between about 20° to 30° C.

4. The apparatus of claim 1 wherein said hermetic compressor includes an electric motor having windings, and, wherein said crankcase heater comprising means for imparting a low voltage to said winding without causing rotation of said motor.

5. The apparatus of claim 4 wherein said means for imparting a low voltage comprises an inverter drive.

* * * * *